United States Patent
Corner et al.

(10) Patent No.: US 9,456,319 B2
(45) Date of Patent: Sep. 27, 2016

(54) TEXT-TO-BILL TRANSACTION PROCESSING SYSTEM

(71) Applicant: Boku, Inc., San Francisco, CA (US)

(72) Inventors: Katherine Ann Corner, San Francisco, CA (US); Chia-ling Sung, San Francisco, CA (US); John Ly, San Francisco, CA (US)

(73) Assignee: Boku, Inc., San Francisco, CA (US)

( * ) Notice: Subject to any disclaimer, the term of this patent is extended or adjusted under 35 U.S.C. 154(b) by 24 days.

(21) Appl. No.: 13/772,247

(22) Filed: Feb. 20, 2013

(65) Prior Publication Data

US 2014/0235197 A1    Aug. 21, 2014

(51) Int. Cl.
| | | |
|---|---|---|
| H04W 4/24 | (2009.01) | |
| H04W 4/14 | (2009.01) | |
| G06Q 20/32 | (2012.01) | |
| H04M 15/00 | (2006.01) | |
| H04M 17/02 | (2006.01) | |

(52) U.S. Cl.
CPC ........... *H04W 4/14* (2013.01); *G06Q 20/3255* (2013.01); *H04M 15/68* (2013.01); *H04M 17/02* (2013.01)

(58) Field of Classification Search
CPC ............ G06Q 30/06; G06Q 30/0633; G06Q 30/0641; G06Q 20/3255; G06Q 20/14; G06Q 20/20; G06Q 20/30; G06Q 20/085; G06Q 20/325; G06Q 20/40; G06Q 20/401; G06Q 20/42; G06Q 30/0229; G06Q 2220/12; G06Q 20/027; H04W 4/14; H04W 4/24; H04W 4/26; H04M 17/02; H04M 15/68
See application file for complete search history.

(56) References Cited

U.S. PATENT DOCUMENTS

| | | | |
|---|---|---|---|
| 7,831,246 B1 | 11/2010 | Smith et al. | |
| 8,583,496 B2 * | 11/2013 | Yoo | G06Q 20/10 705/17 |
| 2007/0021198 A1 | 1/2007 | Muir et al. | |
| 2008/0281722 A1 * | 11/2008 | Balasubramanian | G06Q 30/06 705/26.8 |
| 2011/0055038 A1 | 3/2011 | Mengerink | |
| 2012/0041870 A1 | 2/2012 | Baskerville | |
| 2012/0066096 A1 * | 3/2012 | Penide | G06Q 20/12 705/27.1 |
| 2012/0095905 A1 * | 4/2012 | Hodges | G06Q 20/027 705/39 |
| 2012/0173348 A1 * | 7/2012 | Yoo | G06Q 20/10 705/16 |
| 2012/0231876 A1 * | 9/2012 | de Cuba | G07F 17/3223 463/25 |
| 2012/0276868 A1 * | 11/2012 | Martell | H04L 12/1453 455/406 |
| 2012/0330769 A1 * | 12/2012 | Arceo | G06Q 20/4014 705/21 |
| 2013/0024366 A1 * | 1/2013 | Mukherjee | G06Q 20/20 705/40 |
| 2013/0317980 A1 * | 11/2013 | Davis | G06Q 20/123 705/39 |
| 2015/0088711 A1 * | 3/2015 | Steif | G06Q 20/14 705/34 |

OTHER PUBLICATIONS

"International Search Report and Written Opinion mailed on May 15, 2014", International Patent Application No. PCT/US2014/017509, International Filing Date of Feb. 20, 2014, (9 pages).

\* cited by examiner

*Primary Examiner* — Meless Zewdu
(74) *Attorney, Agent, or Firm* — Stephen M. De Klerk (57) ABSTRACT

A text-to-bill processing transaction system is described. A consumer transmits a text message having a merchant keyword component and a transaction details component. The merchant keyword component is used to find a select merchant server from a merchant server data store. The transaction details component is then routed to the select merchant server. The select merchant server then returns a charge amount corresponding to the transaction details component and a fulfillment message. A billing gateway then causes entry of the charge amount against a phone number in an accounts database of a carrier server. A success message transmission module transmits a text message back to the consumer that includes the fulfillment message. The fulfillment message may for example be a code that has to be entered by a consumer.

11 Claims, 4 Drawing Sheets

TEXT-TO-BILL TRANSACTION PROCESSING SYSTEM

BACKGROUND OF THE INVENTION

1). Field of the Invention

This invention relates to a transaction processing system.

2). Discussion of Related Art

A customer who visits a store usually uses a point-of-sale instrument such as a bank card or a credit card to pay for an item or items that are being purchased. In an in store scenario, the customer may for example purchase goods that are provided to the customer. Electronic transactions can be conducted in a similar manner. In the case of electronic transactions, the user can enter details of a point-of-sale instrument into an interface.

It has become more common to purchase goods, services and credits using devices other than a point-of-sale instrument. Certain systems for example allow for a consumer to have a transaction charged to their phone bill.

The challenge that exists with using systems that do not have a point-of-sale instrument is that they typically require a network connection to allow for the charge to be processed. Such a network connection may be unavailable or may be cumbersome to maintain and operate. For example, arcade games typically do not have any network connections to a merchant to process a charge. Instead, the only way to start a game on an arcade game would be to enter cash into the arcade game.

SUMMARY OF THE INVENTION

The invention provides a transaction processing system, including a text-to-bill processing system including a processor, a computer-readable medium connected to the processor and a set of instructions on the computer-readable medium and executable by the processor. The set of instructions includes an SMS gateway receiving from a mobile phone and a phone number a fulfillment request text message having a merchant keyword component and a transaction details component, a merchant server data store having a plurality of merchant servers and a plurality of merchant keywords associated with the respective merchant servers, a merchant server lookup module connected to the SMS gateway, using the merchant keyword component received in the SMS gateway to lookup a select merchant server from the merchant server data store by matching the merchant keyword component received in the SMS gateway with one of the merchant keywords in the merchant server data store, a server call module, connected to the merchant server lookup module, transmitting the transaction details component to the select merchant server, the server call module receiving a charge from the select merchant server in response to the transmission of the transaction details component, the charge including a charge amount; a billing gateway connected to the server call module, causing entry of the charge amount in an accounts database against the phone number in response to the server call module receiving the charge and a success text message transmission module, connected to the billing gateway, transmitting a success message via the SMS gateway to the mobile phone at the phone number, the success text message being transmitted including a fulfillment message.

The transaction processing system may further include that the server call module transmits a transaction ID that is uniquely generated in response to the receiving of the fulfillment request text message by the SMS gateway to the select merchant server and wherein the charge received from the merchant server includes the transaction ID.

The transaction processing system may further include that the server call module transmits the phone number to the select merchant server, and wherein the charge includes the phone number.

The transaction processing system may further include that the charge includes the fulfillment message that is included in the success text message.

The text-to-bill processing system may further include a sign displaying to a consumer in control of the mobile phone the text message and a destination to transmit the text message from the mobile phone.

The transaction processing system may further include that the billing gateway does not cause entry of the charge amount in response to the SMS gateway receiving the fulfillment request text message and does not cause entry of the charge amount after the server call module transmits the transaction details component to the select merchant server, and only causes entry of the charge amount in response to the server call module receiving the charge amount from the select merchant server.

The transaction processing system may further include that the success text message includes a code that is entered into a game in order for the game to start without the game being connected to the select merchant server via any communications network.

The transaction processing system may further include that the merchant server lookup module determines whether the select merchant server is received from the merchant server data store and the server call module only communicates with a select merchant server if the merchant server lookup module receives the select merchant server from the merchant server data store, further including an error text message transmission module that transmits an error text message via the SMS gateway to the mobile phone at the MSISDN if the merchant server lookup module fails to receive the select merchant server from the merchant server data store.

The transaction processing system may further include an error text message transmission module that, when an error is received from the select merchant server, transmits an error text message to the mobile phone at the MSISDN.

The transaction processing system may further include that the billing gateway only instructs the success text message transmission module to transmit the success text message if the billing gateway is successful in causing entry of the charge amount in the accounts database against the phone number, further including an error text message transmission module that, if the billing gateway fails to cause entry of the charge amount in the accounts database, transmits an error text message to the mobile phone at the MSISDN, the error text message stating the reason why the billing gateway has failed to cause entry of the charge amount in the accounts database.

The invention further provides a method of processing a transaction including receiving, with a processor of a text-to-bill processing system, a text message from a phone number, the text message having a merchant keyword component and a transaction details component, using, with the processor of the text-to-bill processing system, the merchant keyword to lookup a select merchant server from a merchant server data store having a plurality of merchant servers and a plurality of merchant keywords associated with the respective merchant servers in the merchant server data store, transmitting, with the processor of the text-to-bill processing system, the transaction details component to the select merchant server, receiving, with the processor of the text-to-bill processing system, a charge from the merchant server in response to the transmission of the transaction details component, the charge including an amount, causing, with the processor of the text-to-bill processing system, entry of the charge amount in an accounts database against a phone number in response to receiving the charge from the merchant server and transmitting, with the processor of the text-to-bill processing system, a text message to a mobile phone at the phone number, the text message being transmitted including a fulfillment message.

The invention also provides a computer-readable medium having stored thereon a set of instructions which, when executed by a processor of a text-to-bill processing system, performs a method of processing a transaction including receiving, with the processor of the text-to-bill processing system, a text message from a phone number, the text message having a merchant keyword component and a transaction details component, using, with the processor of the text-to-bill processing system, the merchant keyword to lookup a select merchant server from a merchant server data store having a plurality of merchant servers and a plurality of merchant keywords associated with the respective merchant servers in the merchant server data store, transmitting, with the processor of the text-to-bill processing system, the transaction details component to the select merchant server; receiving, with the processor of the text-to-bill processing system, a charge from the merchant server in response to the transmission of the transaction details component, the charge including an amount, causing, with the processor of the text-to-bill processing system, entry of the charge amount in an accounts database against a phone number in response to receiving the charge from the merchant server and transmitting, with the processor of the text-to-bill processing system, a text message to a mobile phone at the phone number, the text message being transmitted including a fulfillment message.

BRIEF DESCRIPTION OF THE DRAWINGS

Embodiments of the invention are described by way of examples with reference to the accompanying drawings, wherein.

DETAILED DESCRIPTION OF THE INVENTION

Figure 1:
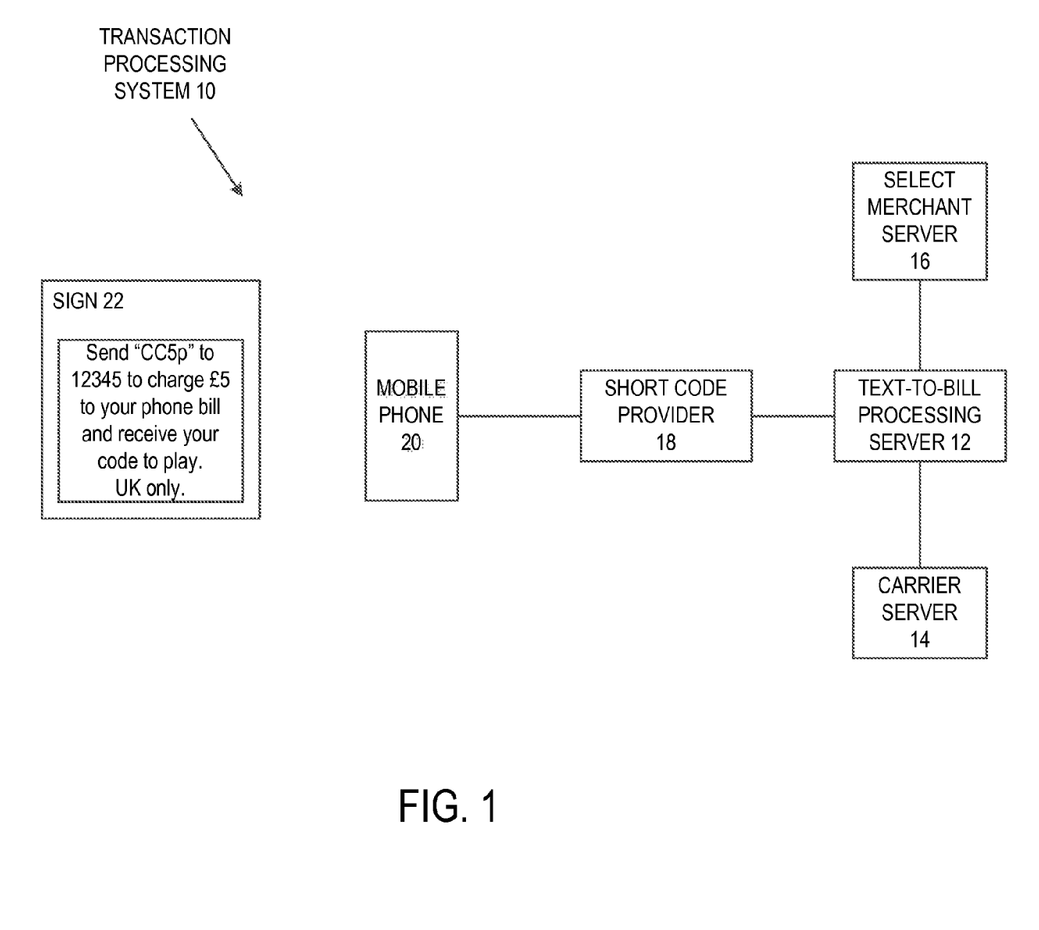
FIG. 1 is a block diagram of a transaction processing system according to an embodiment of the invention.

FIG. 1 of the accompanying drawing illustrates a transaction processing system 10 that includes a text-to-bill processing server 12, a carrier server 14, a select merchant server 16, a short code provider 18, a mobile phone 20, and a sign 22 having instructions.

In the example that will be described a consumer wishing to play a game on an arcade game requires a code and needs to pay for the code in order to play a game on the arcade game. The arcade game is not connected to any network and cannot be activated remotely.

The sign 22 has a message with instructions for the consumer to follow in order to obtain a fulfillment message that has a code. As further shown in FIG. 2, the consumer is in control of the mobile phone 20 and creates and transmits a fulfillment request text message 24 according to the instructions on the sign 22 in FIG. 1. The fulfillment request text message 24 includes "CC5p" and is transmitted to a short code "12345" and is transmitted from a Mobile Subscriber Integrated Services Digital Network-Number (MSISDN, or phone number) of the mobile phone 20. The text message "CC5p" includes a merchant keyword component "CC" and a transaction details component "5p."

Figure 2:
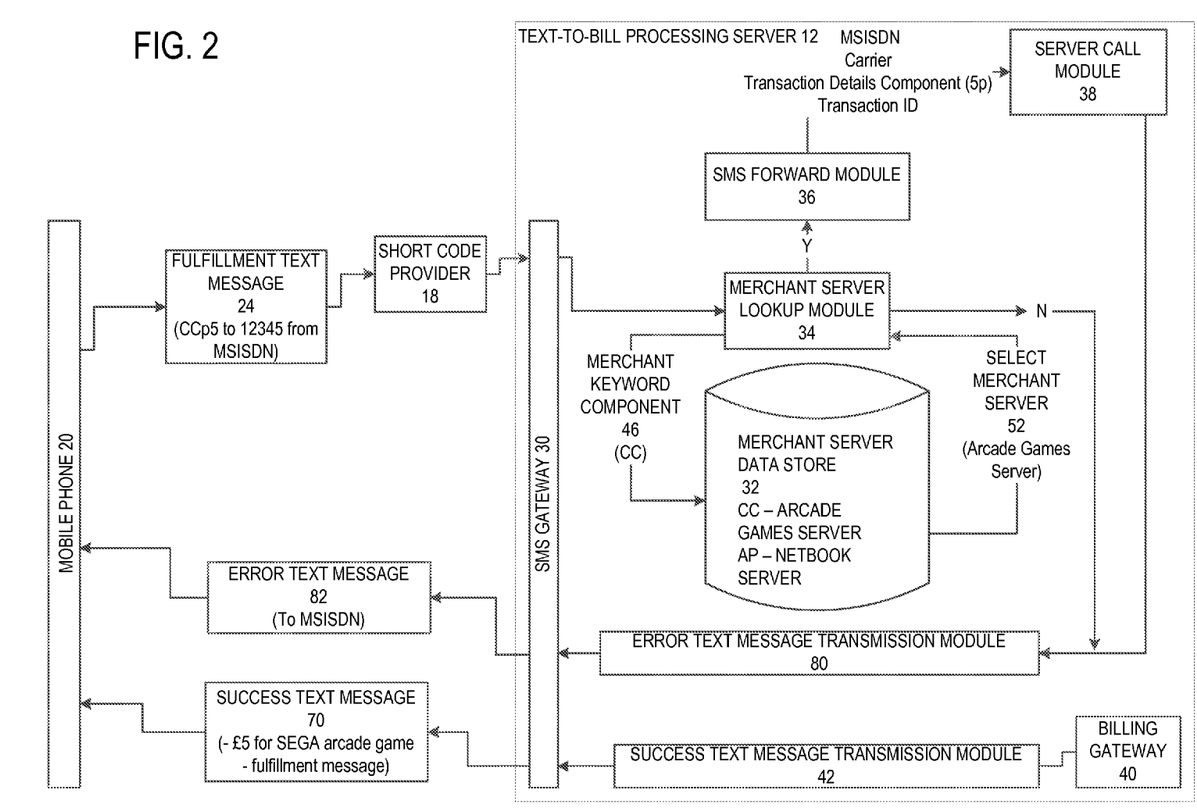
FIG. 2 is block diagram of a mobile phone, short code provider and a text-to-bill processing server of the system.

The fulfillment request text message 24 is received by the short code provider 18. The short code provider 18 uses the destination "12345" to identify the text-to-bill processing server 12 among a plurality of servers. The short code provider 18 then routes the fulfillment request text message 24 to the text-to-bill processing server 12.

The text-to-bill processing server 12 includes a Short Message Service (SMS) gateway 30, a merchant server data store 32, a merchant server lookup module 34, an SMS forward module 36, a server call module 38, a billing gateway 40, and a success text message transmission module 42.

The SMS gateway 30 receives the fulfillment request text message 24 from the mobile phone 20 via the short code provider 18 over an SMS network. The fulfillment request text message 24 received by the SMS gateway 30 includes the merchant keyword component and the transaction details component.

The merchant server data store 32 has a plurality of merchant servers such as "Arcade Games Server" and "Netbook Server". The merchant server data store 32 also has a plurality of merchant keywords such as "CC" and "AP" associated with the respective merchant servers. The merchant server lookup module 34 is connected to the SMS gateway 30. The merchant server lookup module 34 uses the merchant keyword component 46 originally received in the SMS gateway 30 to lookup a select merchant server from the merchant server data store 32 by matching the merchant keyword component 46 received in the SMS gateway 30 with one of the merchant keywords in the merchant server data store 32. In this present example, the merchant server lookup module 34 matches the merchant keyword component 46 "CC" with the merchant keyword component "CC" in the merchant server data store 32 and finds the merchant server "Arcade Games Server" corresponding to "CC" in the merchant server data store 32. The merchant server "Arcade Games Server" then becomes a select merchant server 52 that is returned to the merchant server lookup module 34 from the merchant server data store 32.

If the merchant server lookup module 34 has successfully found a select merchant server 52 from the merchant server data store 32, the merchant server lookup module 34 provides the text message to the SMS forward module 36. The SMS forward module 36 then provides the server call module 38 with the MSISDN of the mobile phone 20, carrier of the mobile phone 20, the transaction details component "5p" and a transaction ID that has been uniquely created in response to the particular fulfillment request text message 24 received at the SMS gateway 30.

Figure 3:
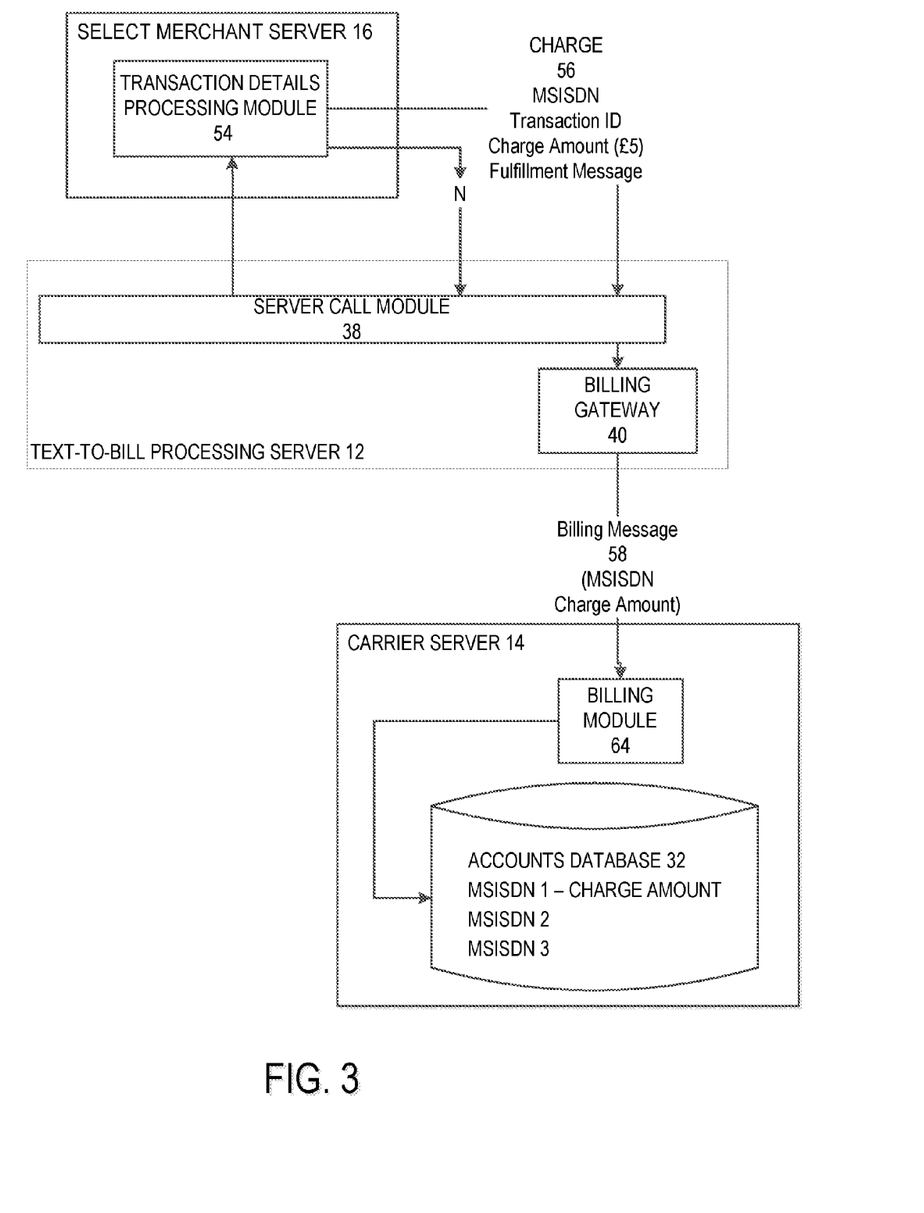
FIG. 3 is a block diagram of components of the text-to-bill processing system, a select merchant server and a carrier server of the system.

As shown in FIG. 3, the server call module 38 then provides the MSISDN, carrier, transaction details component and transaction ID to the select merchant server 16. The select merchant server 16 is the server corresponding to the select merchant server 52 extracted from the merchant server data store 32. For security purposes, the server call module 38 provides a masked version of the MSISDN to the select merchant server 16. Other parameters that are provided to the select merchant server 16 may be the names of the country as identified by ISO 3166-1-alpha-2 standard, a unique network code for a carrier, a currency code as defined by ISO 4217-3, a product disclosure describing the quantity and type of item being purchased, etc.

The select merchant server 16 includes a transaction details processing module 54 that uses the transaction details component "5p" to determine a charge amount corresponding to the transaction details component. In the present example, the charge amount corresponding to the transaction details component "5p" is £5. If the transaction details processing module 54 successfully finds a charge amount corresponding to the transaction details component "5p" then the transaction details processing module 54 creates and transmits a charge 56 back to the server call module 38. The charge 56 includes the MSISDN of the mobile phone 20 received by the transaction details processing module 54 from the server call module 38, the transaction ID received by the transaction details processing module 54 from the server call module 38, the charge amount of £5 and a fulfillment message. The fulfillment message may for example be the code required by the consumer in order to play the arcade game. The server call module 38 then receives the charge 56 and its components from the select merchant server 16.

The server call module 38 then passes the charge 56 on to the billing gateway 40. The billing gateway 40 generates a billing message 58 to the carrier server 14 that includes the MSISDN of the mobile phone 20 and the charge amount. The carrier server 14 includes an accounts database 62 and a billing module 64. The accounts database 62 includes a number of accounts that are identified by their respective MSISDN's (MSISDN1, MSISDN2, MSISDN3, etc.) and the billing module 64 receives the billing message 58 from the text-to-bill processing server 12 and uses the MSISDN received in the billing message 58 to find a corresponding MSISDN in the accounts database 62. The billing module 64 then enters the charge amount against the MSISDN that has been looked up in the accounts database 62 corresponding to the MSISDN in the billing message 58. The billing gateway 40 thus causes entry of the charge amount in the accounts database 62 against the MSISDN in response to the server call module 38 receiving the charge 56 from the select merchant server 16.

What should be noted is that the billing gateway 40 does not cause the transmission of the billing message 58 and the entry of the charge amount in the accounts database 62 without the server call module 38 first receiving the charge 56 including the charge amount from the select merchant server 16. In particular, when the SMS gateway 30 in FIG. 2 receives the fulfillment request text message 24, the billing gateway 40 does not cause entry of a charge amount in the accounts database 62. Even after the server call module 38 transmits the data of the transaction to the select merchant server 16 the billing gateway 40 still does not enter any charge amount in the accounts database 62.

As further shown in FIG. 2, the success text message transmission module 42 is connected to the billing gateway 40. The billing gateway 40, upon successful entry of the charge amount in the accounts database 62, causes the success text message transmission module 42 to transmit a success text message 70 via the SMS gateway 30 to the mobile phone 20 having the MSISDN that was identified by the text-to-bill processing server 12 from the fulfillment request text message 24. The success text message 70 being transmitted includes information about the charge that has been entered in the accounts database 62 and the fulfillment request text message 24 received by the server call module 38 in the charge 56. In the present example the success text message 70 includes text indicating that an amount of £5 was charged for the consumer to play the SEGA arcade game. The success text message 70 may be a unique code that the consumer can enter into the game in order for the game to start. The game can thus be started without the game being connected to the select merchant server 16 via any communications network.

The merchant server lookup module 34 may not receive the valid select merchant server 52 from the merchant server data store 32. The text-to-bill processing server 12 further includes an error text message transmission module 80 that is connected to the merchant server lookup module 34. If the merchant server lookup module 34 fails to receive a valid select merchant server 52 in the merchant server lookup module 34 instructs the error text message transmission module 80 to transmit an error text message 82 via the SMS gateway 30 to the mobile phone 20 having the MSISDN. The error text message 82 that is transmitted under these circumstances states that the text in the fulfillment request text message 24 was incorrect and does not include the code that is included if the success text message 70 in transmitted. Furthermore, the merchant server lookup module 34 does not instruct the SMS forward module 36 to carry out the processes hereinbefore described with reference to FIG. 3 wherein the server call module 38 communicates with the select merchant server 16.

As further illustrated in FIG. 3, the transaction details processing module 54 of the select merchant server 16 determines whether the transaction details component "5p" is a valid transaction details component within the select merchant server 16. Only if the transaction details processing module 54 determines that the transaction details component is valid within the select merchant server 16 does the transaction details processing module 54 transmit the charge 56 back to the server call module 38 of the text-to-bill processing server 12. If the transaction details processing module 54 determines that the transaction details component is not valid then the transaction details processing module 54 communicates the error to the server call module 38. As shown in FIG. 2, the error text message transmission module 80 is connected to the server call module 38 and, in response to the error received for the transaction details processing module 54, transmits the error text message 82 via the SMS gateway 30 to the mobile phone 20 at the MSISDN. The error text message 82 in this scenario includes that the text message sent by the user was incorrect and does not include the PIN code that is included if the success text message 70 is transmitted.

It may also be possible for the billing gateway 40 to communicate with the carrier server 14 in FIG. 3 to determine whether the MSISDN within the accounts database 62 can be billed. The billing gateway 40 only instructs the success text message transmission module 42 in FIG. 2 to transmit a success text message 70 if the carrier server 14 does not decline the billing message 58. If the carrier server 14 in FIG. 3 declines the billing message 58, then the billing gateway 40 instructs the error text message transmission module 80 in FIG. 2 to transmit the error text message 82 via the SMS gateway 30 to the mobile phone 20 at the MSISDN. The error text message 82 will, in this scenario, include that the transaction cannot be completed and state the reason why the carrier server 14 has declined the charge 56 and will not include the code that would be transmitted by the success text message 70. The carrier server 14 may for example decline the charge 56 if insufficient funds are available, when a spending limit has been reached, when the carrier server 14 is down, or if the MSISDN is blacklisted.

Further reasons why the error text message transmission module 80 may transmit an error text message 82 include the user's abandonment of the transaction due to, for example, transmission of other text messages relating to other games, a time-out by the select merchant server 16, i.e. no response is received from the select merchant server 16 by the server call module 38 within a given amount of time, or the MSISDN is not identified to be within a required geographic area such as the United Kingdom shown in the sign 22, etc.

In certain instances, in particular for reasons of sensitivity from a security or risk point of view, the error message that is transmitted back to the mobile phone 20 includes only a generic narrative instead of a narrative that specifies why the transaction has failed. For example, internal fraud/risk algorithms may trigger that the user of the mobile phone 20 is a potentially fraudulent user. In such a scenario, the narrative of the error message only states that the user should contact customer support and/or that the transaction failed so that users cannot deduce the nature of internal risk/fraud algorithms.

The transaction processing system 10 thus allows for the purchase of credits, goods or services at a location where it is not possible or desired to communicate over a network system such as the Internet, an SMS network, etc. with the select merchant server 16. Text messaging is used to purchase the credits, goods or services and to be billed for it and text messaging is used to return a fulfillment message that is required in order to accept the credits, goods or services.

The invention has been described with reference to a specific example wherein a code has to be entered in order to play a game. It should be understood that the invention should not be limited to this particular embodiment. For example, another embodiment may be for providing customers to make micro-purchases for wireless access, e.g. 2 hours of wireless access or 1 day of wireless access. Once the remote text-to-bill processing has been completed, the customer will receive a code in the success text message 70 that can then be entered into a promotional code field. The instructions may then be displayed online together with a PIN that can be entered on a connected device.

Furthermore, the embodiment that has been described uses the sign 22 in FIG. 1 for purposes of providing instructions to a user. In another embodiment, instructions could appear on a web site, in a mobile application, or on an advertisement at, for example, a train station, on a poster at a doctor's office, etc. Online signs would allow a merchant to instruct a user to enter dynamic transaction details specific to a single transaction. By contrast, the embodiment that has been described uses a more static approach wherein the transaction details component "5p" always equates to a £5 charge.

Figure 4:
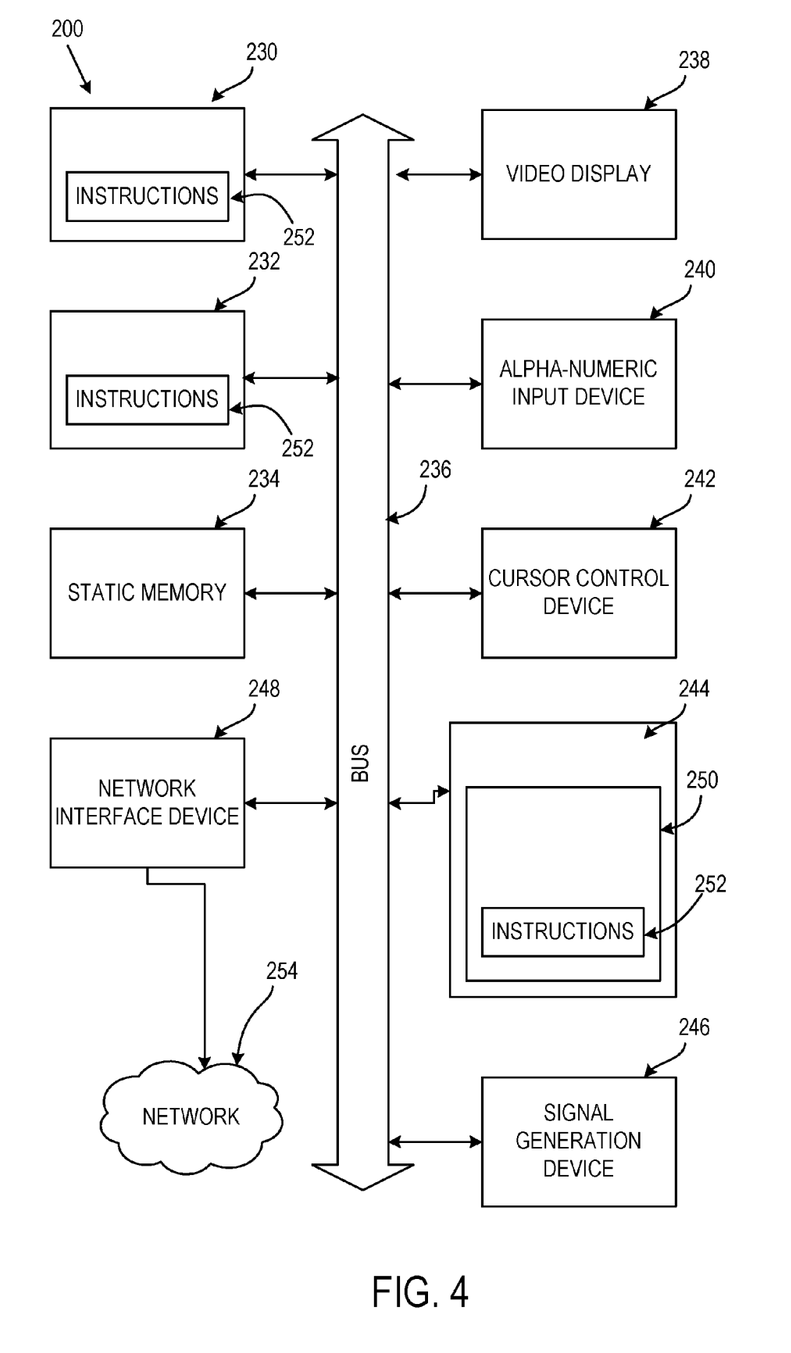
FIG. 4 is a block diagram of a machine in the form of a computer system forming part of the transaction processing system.

FIG. 4 shows a diagrammatic representation of a machine in the exemplary form of a computer system 200 within which a set of instructions, for causing the machine to perform any one or more of the methodologies discussed herein, may be executed. In alternative embodiments, the machine operates as a standalone device or may be connected (e.g., networked) to other machines. In a network deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 200 includes a processor 230 (e.g., a central processing unit (CPU), a graphics processing unit (GPU), or both), a main memory 232 (e.g., read-only memory (ROM), flash memory, dynamic random access memory (DRAM) such as synchronous DRAM (SDRAM) or Rambus DRAM (RDRAM), etc.), and a static memory 234 (e.g., flash memory, static random access memory (SRAM, etc.), which communicate with each other via a bus 236.

The computer system 200 may further include a video display 238 (e.g., a liquid crystal display (LCD) or a cathode ray tube (CRT)). The computer system 200 also includes an alpha-numeric input device 240 (e.g., a keyboard), a cursor control device 242 (e.g., a mouse), a disk drive unit 244, a signal generation device 246 (e.g., a speaker), and a network interface device 248.

The disk drive unit 244 includes a machine-readable medium 250 on which is stored one or more sets of instructions 252 (e.g., software) embodying any one or more of the methodologies or functions described herein. The software may also reside, completely or at least partially, within the main memory 232 and/or within the processor 230 during execution thereof by the computer system 200, the memory 232 and the processor 230 also constituting machine readable media. The software may further be transmitted or received over a network 254 via the network interface device 248.

While the instructions 252 are shown in an exemplary embodiment to be on a single medium, the term "machine-readable medium" should be taken to understand a single medium or multiple media (e.g., a centralized or distributed database or data source and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories and optical and magnetic media.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A transaction processing system, comprising:
   a text-to-bill processing server including:
   a processor;
   a computer-readable medium connected to the processor; and
   a set of instructions on the computer-readable medium and executable by the processor, including:
   an Short Message Service gateway (SMS gateway) receiving from a mobile phone a phone number and a fulfillment request text message having a merchant keyword component and a transaction details component;

a merchant server data store having a plurality of merchant servers and a plurality of merchant keywords associated with the respective merchant servers;

a merchant server lookup module connected to the SMS gateway, using the merchant keyword component received in the SMS gateway to lookup a select merchant server from the merchant server data store by matching the merchant keyword component received in the SMS gateway with one of the merchant keywords in the merchant server data store;

a server call module, connected to the merchant server lookup module, transmitting the transaction details component to the select merchant server, the server call module receiving a charge from the select merchant server in response to the transmission of the transaction details component, the charge including a charge amount and a fulfillment message;

a billing gateway connected to the server call module, causing entry of the charge amount in an accounts database against the phone number in response to the server call module receiving the charge; and a success text message transmission module, connected to the billing gateway, transmitting a success text message via the SMS gateway to the mobile phone at the phone number, the success text message being transmitted to the mobile phone after the server call module receives the charge from the merchant server and including the fulfillment message received by the server call module from the merchant server as part of the charge.

2. The transaction processing system of claim 1, wherein the server call module transmits a transaction ID that is uniquely generated in response to the receiving of the fulfillment request text message by the SMS gateway to the select merchant server and wherein the charge received from the merchant server includes the transaction ID.

3. The transaction processing system of claim 2, wherein the server call module transmits the phone number to the select merchant server, and wherein the charge includes the phone number.

4. The transaction processing system of claim 1, further comprising:

a sign displaying to a consumer in control of the mobile phone the fulfillment request text message and a destination to transmit the text message from the mobile phone.

5. The transaction processing system of claim 1, wherein the billing gateway does not cause entry of the charge amount in response to the SMS gateway receiving the fulfillment request text message and does not cause entry of the charge amount after the server call module transmits the transaction details component to the select merchant server, and only causes entry of the charge amount in response to the server call module receiving the charge amount from the select merchant server.

6. The transaction processing system of claim 1, wherein the success text message includes a code that is entered into a game in order for the game to start without the game being connected to the select merchant server via any communications network.

7. The transaction processing system of claim 1, wherein the merchant server lookup module determines whether the select merchant server is received from the merchant server data store and the server call module only communicates with a select merchant server if the merchant server lookup module receives the select merchant server from the merchant server data store, further comprising:

an error text message transmission module that transmits an error text message via the SMS gateway to the mobile phone at an Mobile Station International Subscriber Directory Number (MSISDN) if the merchant server lookup module fails to receive the select merchant server from the merchant server data store.

8. The transaction processing system of claim 1, further comprising: an error text message transmission module that, when an error is received from the select merchant server, transmits an error text message to the mobile phone at an Mobile Station International Subscriber Directory Number (MSISDN).

9. The transaction processing system of claim 1, wherein the billing gateway only instructs the success text message transmission module to transmit the success text message if the billing gateway is successful in causing entry of the charge amount in the accounts database against the phone number, further comprising:

an error text message transmission module that, if the billing gateway fails to cause entry of the charge amount in the accounts database, transmits an error text message to the mobile phone at an Mobile Station International Subscriber Directory Number gateway (MSISDN gateway), the error text message stating the reason why the billing gateway has failed to cause entry of the charge amount in the accounts database.

10. A method of processing a transaction comprising:

receiving, with a processor of a text-to-bill processing server, a text message from a phone number, the text message having a merchant keyword component and a transaction details component;

using, with the processor of the text-to-bill processing server, the merchant keyword to lookup a select merchant server from a merchant server data store having a plurality of merchant servers and a plurality of merchant keywords associated with the respective merchant servers in the merchant server data store, the merchant server being determined with a merchant server lookup module;

transmitting, with the processor of the text-to-bill processing server, the transaction details component to the select merchant server using a server call module connected to the merchant server lookup module;

receiving, with the processor of the text-to-bill processing server, a charge from the merchant server in response to the transmission of the transaction details component, the charge including an amount and a fulfillment message, using the server call module connected to the merchant server lookup module;

causing, with the processor of the text-to-bill processing server, entry of the charge amount in an accounts database against a phone number in response to receiving the charge from the merchant sever; and transmitting, with the processor of the text-to-bill processing server a success text message via an Short Message Service gateway (SMS gateway) to the mobile phone at the phone number, the success text message being transmitted to the mobile phone after receiving the charge from the merchant server and including the fulfillment message received as part of the charge.

11. A transaction processing system comprising:
a processor;
computer-readable medium connected to the processor; and
a set of instructions on the computer-readable medium which, when executed by a processor of a text-to-bill processing server, performs a method of processing a transaction comprising:
receiving, with a processor of a text-to-bill processing server, a text message from a phone number, the text message having a merchant keyword component and a transaction details component;
using, with the processor of the text-to-bill processing server, the merchant keyword to lookup a select merchant server from a merchant server data store having a plurality of merchant servers and a plurality of merchant keywords associated with the respective merchant servers in the merchant server data store, the merchant server being determined with a merchant server lookup module;
transmitting, with the processor of the text-to-bill processing server, the transaction details component to the select merchant server using a server call module connected to the merchant server lookup module;
receiving, with the processor of the text-to-bill processing server, a charge from the merchant server in response to the transmission of the transaction details component, the charge including an amount and a fulfilment message using the server call module connected to the merchant server lookup module;
causing, with the processor of the text-to-bill processing server, entry of the charge amount in an accounts database against a phone number in response to receiving the charge from the merchant sever; and
transmitting, with the processor of the text-to-bill processing server, a success text message via an Short Message Service gateway (SMS gateway) to the mobile phone at the phone number, the success text message being transmitted to the mobile phone after receiving the charge from the merchant server and including the fulfillment message received as part of the charge.

* * * * *